United States Patent
Everingham (10) Patent No.: US 9,384,408 B2
(45) Date of Patent: Jul. 5, 2016

(54) IMAGE ANALYSIS SYSTEM AND METHOD USING IMAGE RECOGNITION AND TEXT SEARCH

(75) Inventor: James R. Everingham, Santa Cruz, CA (US)

(73) Assignee: Yahoo! Inc., Sunnyvale, CA (US)

( * ) Notice: Subject to any disclaimer, the term of this patent is extended or adjusted under 35 U.S.C. 154(b) by 980 days.

(21) Appl. No.: 13/005,217

(22) Filed: Jan. 12, 2011

(65) Prior Publication Data

US 2012/0177297 A1  Jul. 12, 2012

(51) Int. Cl.
*G06K 9/00* (2006.01)
*G06K 9/32* (2006.01)

(52) U.S. Cl.
CPC ..................... *G06K 9/325* (2013.01)

(58) Field of Classification Search
USPC ........................................................ 382/155
See application file for complete search history.

(56) References Cited

U.S. PATENT DOCUMENTS

| | | | |
|---|---|---|---|
| D297,243 S | 8/1988 | Wells-Papanek et al. |
| 4,789,962 A | 12/1988 | Berry et al. |
| 5,008,853 A | 4/1991 | Bly et al. |
| 5,199,104 A | 3/1993 | Hirayama |
| 5,287,448 A | 2/1994 | Nicol et al. |
| 5,349,518 A | 9/1994 | Zifferer et al. |
| 5,367,623 A | 11/1994 | Iawi et al. |
| 5,428,733 A | 6/1995 | Carr |
| 5,583,655 A | 12/1996 | Tsukamoto et al. |
| 5,589,892 A | 12/1996 | Knee et al. |
| 5,615,367 A | 3/1997 | Bennett et al. |
| 5,627,958 A | 5/1997 | Potts et al. |
| D384,050 S | 9/1997 | Kodosky |
| D384,052 S | 9/1997 | Kodosky |
| 5,682,469 A | 10/1997 | Linnett et al. |
| 5,684,716 A | 11/1997 | Freeman |
| 5,689,669 A | 11/1997 | Lynch et al. |
| 5,706,507 A | 1/1998 | Schloss |
| 5,721,906 A | 2/1998 | Siefert |
| 5,724,484 A | 3/1998 | Kagami |
| 5,754,176 A | 5/1998 | Crawford |
| 5,796,932 A | 8/1998 | Fox et al. |
| D406,828 S | 3/1999 | Newton et al. |
| 5,933,138 A | 8/1999 | Driskell |
| 5,956,029 A | 9/1999 | Okada et al. |
| 6,026,377 A | 2/2000 | Burke |
| 6,034,687 A | 3/2000 | Taylor et al. |
| D427,576 S | 7/2000 | Coleman |

(Continued)

OTHER PUBLICATIONS

Cascia et al., "Combining Textual and Visual Cues for Content-based Image Retrieval on the World Wide Web," IEEE Workshop on Content-based Access of Image and Video Libraries (Jun. 1998).

(Continued)

*Primary Examiner* — Hadi Akhavannik
(74) *Attorney, Agent, or Firm* — Brinks Gilson & Lione (57) ABSTRACT

Provided herein are systems and method for obtaining contextual information of an image published on a digital medium. The methods and systems disclosed herein generally identify and analyze the image to obtain image descriptors corresponding to the image. The methods also identify and analyze text published proximate to the image to obtain textual descriptors, which function to describe, identify, index, or name the image or content within the image. The textual descriptors are then matched to the image descriptors to provide contextual information of the published image.

22 Claims, 4 Drawing Sheets

(56) References Cited

U.S. PATENT DOCUMENTS

| | | |
|---|---|---|
| 6,285,381 B1 | 9/2001 | Sawano et al. |
| D450,059 S | 11/2001 | Itou |
| 6,356,908 B1 | 3/2002 | Brown et al. |
| 6,414,679 B1 | 7/2002 | Miodonski et al. |
| D469,104 S | 1/2003 | Istvan et al. |
| 6,513,035 B1 | 1/2003 | Tanaka et al. |
| 6,728,752 B1 | 4/2004 | Chen et al. |
| 6,941,321 B2 * | 9/2005 | Schuetze ............ G06F 17/3071 |
| 7,069,308 B2 | 6/2006 | Abrams |
| D528,552 S | 9/2006 | Nevill-Manning |
| D531,185 S | 10/2006 | Cummins |
| 7,117,254 B2 | 10/2006 | Lunt et al. |
| 7,124,372 B2 | 10/2006 | Brin |
| 7,159,185 B1 | 1/2007 | Vedula et al. |
| 7,231,395 B2 | 6/2007 | Fain et al. |
| 7,233,316 B2 | 6/2007 | Smith et al. |
| 7,251,637 B1 | 7/2007 | Caid et al. |
| D553,632 S | 10/2007 | Harvey et al. |
| D555,661 S | 11/2007 | Kim |
| D557,275 S | 12/2007 | De Mar et al. |
| D562,840 S | 2/2008 | Cameron |
| D566,716 S | 4/2008 | Rasmussen et al. |
| D567,252 S | 4/2008 | Choe et al. |
| 7,383,510 B2 | 6/2008 | Pry |
| D577,365 S | 9/2008 | Flynt et al. |
| 7,428,504 B2 | 9/2008 | Song |
| 7,437,358 B2 | 10/2008 | Arrouye et al. |
| 7,502,785 B2 | 3/2009 | Chen et al. |
| D590,412 S | 4/2009 | Saft et al. |
| 7,519,200 B2 | 4/2009 | Gokturk et al. |
| 7,519,595 B2 | 4/2009 | Solaro et al. |
| 7,542,610 B2 | 6/2009 | Gokturk et al. |
| 7,558,781 B2 | 7/2009 | Probst et al. |
| D600,704 S | 9/2009 | LaManna et al. |
| D600,706 S | 9/2009 | LaManna et al. |
| 7,599,938 B1 | 10/2009 | Harrison, Jr. |
| 7,627,556 B2 * | 12/2009 | Liu ................... G06F 17/30265 |
| 7,657,100 B2 | 2/2010 | Gokturk et al. |
| 7,657,126 B2 | 2/2010 | Gokturk et al. |
| 7,660,468 B2 | 2/2010 | Gokturk et al. |
| D613,299 S | 4/2010 | Owen et al. |
| D613,750 S | 4/2010 | Truelove et al. |
| D614,638 S | 4/2010 | Viegers et al. |
| 7,760,917 B2 | 7/2010 | Vanhoucke et al. |
| 7,774,333 B2 | 8/2010 | Colledge et al. |
| 7,783,135 B2 | 8/2010 | Gokturk et al. |
| 7,792,818 B2 | 9/2010 | Fain et al. |
| D626,133 S | 10/2010 | Murphy et al. |
| 7,809,722 B2 | 10/2010 | Gokturk et al. |
| D629,411 S | 12/2010 | Weir et al. |
| D638,025 S | 5/2011 | Saft et al. |
| 7,945,653 B2 | 5/2011 | Zuckerberg et al. |
| D643,044 S | 8/2011 | Ording |
| 8,024,345 B2 | 9/2011 | Colledge et al. |
| 8,027,940 B2 | 9/2011 | Li et al. |
| 8,036,990 B1 | 10/2011 | Mir et al. |
| 8,055,688 B2 | 11/2011 | Giblin |
| 8,060,161 B2 | 11/2011 | Kwak |
| 8,065,184 B2 | 11/2011 | Wright et al. |
| D652,424 S | 1/2012 | Cahill et al. |
| 8,136,028 B1 | 3/2012 | Loeb et al. |
| 8,166,383 B1 | 4/2012 | Everingham et al. |
| 8,175,922 B2 | 5/2012 | Jones et al. |
| 8,234,168 B1 | 7/2012 | Lagle Ruiz et al. |
| D664,976 S | 8/2012 | Everingham |
| D664,977 S | 8/2012 | Everingham |
| 8,250,145 B2 | 8/2012 | Zuckerberg et al. |
| 8,255,495 B1 | 8/2012 | Lee |
| 8,280,959 B1 | 10/2012 | Zuckerberg et al. |
| 8,311,889 B1 | 11/2012 | Lagle Ruiz et al. |
| 8,392,538 B1 | 3/2013 | Lee |
| 2002/0065844 A1 | 5/2002 | Robinson et al. |
| 2003/0050863 A1 | 3/2003 | Radwin |
| 2003/0131357 A1 | 7/2003 | Kim |
| 2003/0220912 A1 | 11/2003 | Fain et al. |
| 2004/0070616 A1 | 4/2004 | Hildebrandt et al. |
| 2004/0247206 A1 * | 12/2004 | Kaneda et al. ................. 382/305 |
| 2005/0216300 A1 | 9/2005 | Appleman et al. |
| 2005/0235062 A1 | 10/2005 | Lunt et al. |
| 2005/0251760 A1 | 11/2005 | Sato et al. |
| 2006/0155684 A1 | 7/2006 | Liu et al. |
| 2006/0179453 A1 * | 8/2006 | Kadie et al. ...................... 725/34 |
| 2006/0265400 A1 | 11/2006 | Fain et al. |
| 2007/0032244 A1 | 2/2007 | Counts et al. |
| 2007/0118520 A1 | 5/2007 | Bliss et al. |
| 2007/0157119 A1 | 7/2007 | Bishop |
| 2007/0203903 A1 | 8/2007 | Attaran Rezaei et al. |
| 2007/0219968 A1 | 9/2007 | Frank |
| 2007/0255785 A1 | 11/2007 | Hayashi et al. |
| 2007/0258646 A1 | 11/2007 | Sung et al. |
| 2008/0002864 A1 * | 1/2008 | Das et al. ...................... 382/118 |
| 2008/0016040 A1 | 1/2008 | Jones et al. |
| 2008/0046458 A1 | 2/2008 | Tseng et al. |
| 2008/0079696 A1 | 4/2008 | Shim et al. |
| 2008/0082426 A1 | 4/2008 | Gokturk et al. |
| 2008/0091723 A1 | 4/2008 | Zuckerberg et al. |
| 2008/0134088 A1 | 6/2008 | Tse et al. |
| 2008/0141110 A1 | 6/2008 | Gura |
| 2008/0163379 A1 | 7/2008 | Robinson et al. |
| 2008/0177640 A1 | 7/2008 | Gokturk et al. |
| 2008/0199075 A1 | 8/2008 | Gokturk et al. |
| 2008/0208849 A1 | 8/2008 | Conwell |
| 2008/0268876 A1 | 10/2008 | Gelfand et al. |
| 2008/0306933 A1 | 12/2008 | Valliani et al. |
| 2009/0006375 A1 | 1/2009 | Lax et al. |
| 2009/0007012 A1 | 1/2009 | Mandic et al. |
| 2009/0064003 A1 | 3/2009 | Harris et al. |
| 2009/0070435 A1 | 3/2009 | Abhyanker |
| 2009/0113475 A1 | 4/2009 | Li |
| 2009/0125544 A1 * | 5/2009 | Brindley ...................... 707/102 |
| 2009/0144392 A1 | 6/2009 | Wang et al. |
| 2009/0148045 A1 * | 6/2009 | Lee et al. ...................... 382/190 |
| 2009/0158146 A1 | 6/2009 | Curtis et al. |
| 2009/0159342 A1 | 6/2009 | Markiewicz et al. |
| 2009/0165140 A1 | 6/2009 | Robinson et al. |
| 2009/0171964 A1 | 7/2009 | Eberstadt et al. |
| 2009/0193032 A1 | 7/2009 | Pyper |
| 2009/0208116 A1 * | 8/2009 | Gokturk et al. ............... 382/209 |
| 2009/0228838 A1 | 9/2009 | Ryan et al. |
| 2009/0287669 A1 | 11/2009 | Bennett |
| 2009/0313239 A1 * | 12/2009 | Wen ................ G06F 17/30256 |
| 2010/0005001 A1 | 1/2010 | Aizen et al. |
| 2010/0005087 A1 | 1/2010 | Basco |
| 2010/0046842 A1 * | 2/2010 | Conwell ...................... 382/218 |
| 2010/0054600 A1 | 3/2010 | Anbalagan et al. |
| 2010/0054601 A1 | 3/2010 | Anbalagan et al. |
| 2010/0063961 A1 | 3/2010 | Guiheneuf |
| 2010/0077290 A1 | 3/2010 | Pueyo |
| 2010/0161631 A1 | 6/2010 | Yu et al. |
| 2010/0191586 A1 | 7/2010 | Veeramachaneni et al. |
| 2010/0260426 A1 | 10/2010 | Huang et al. |
| 2010/0287236 A1 | 11/2010 | Amento et al. |
| 2010/0290699 A1 * | 11/2010 | Adam et al. ................... 382/155 |
| 2010/0312596 A1 | 12/2010 | Saffari et al. |
| 2010/0313143 A1 | 12/2010 | Jung et al. |
| 2011/0010676 A1 | 1/2011 | Khosravy |
| 2011/0022958 A1 | 1/2011 | Kang et al. |
| 2011/0072047 A1 | 3/2011 | Wang et al. |
| 2011/0082825 A1 | 4/2011 | Sathish |
| 2011/0087990 A1 | 4/2011 | Ng et al. |
| 2011/0131537 A1 | 6/2011 | Cho et al. |
| 2011/0138300 A1 | 6/2011 | Kim et al. |
| 2011/0164058 A1 | 7/2011 | Lemay |
| 2011/0173190 A1 | 7/2011 | van Zwol et al. |
| 2011/0184814 A1 | 7/2011 | Konkol et al. |
| 2011/0196863 A1 | 8/2011 | Marcucci et al. |
| 2011/0225508 A1 * | 9/2011 | Steelberg ............ G06Q 30/02 715/747 |
| 2011/0243459 A1 | 10/2011 | Deng |
| 2011/0264736 A1 | 10/2011 | Zuckerberg et al. |
| 2011/0276396 A1 | 11/2011 | Rathod |
| 2011/0280447 A1 | 11/2011 | Conwell |
| 2011/0288935 A1 | 11/2011 | Elvekrog et al. |
| 2011/0296339 A1 | 12/2011 | Kang |

(56) References Cited

U.S. PATENT DOCUMENTS

| | | | |
|---|---|---|---|
| 2012/0005209 A1 | 1/2012 | Rinearson et al. | |
| 2012/0036132 A1 | 2/2012 | Doyle | |
| 2012/0054355 A1 | 3/2012 | Arrasvuori et al. | |
| 2012/0059884 A1 | 3/2012 | Rothschild | |
| 2012/0075433 A1 | 3/2012 | Tatzgern et al. | |
| 2012/0086792 A1* | 4/2012 | Akbarzadeh et al. | 348/77 |
| 2012/0110464 A1 | 5/2012 | Chen et al. | |
| 2012/0158668 A1 | 6/2012 | Tu et al. | |
| 2012/0185343 A1 | 7/2012 | Jones | |
| 2012/0203651 A1 | 8/2012 | Leggatt | |
| 2012/0205436 A1 | 8/2012 | Thomas et al. | |
| 2012/0231425 A1 | 9/2012 | Calman et al. | |
| 2012/0233000 A1 | 9/2012 | Fisher et al. | |
| 2012/0233143 A1 | 9/2012 | Everingham | |
| 2012/0258776 A1 | 10/2012 | Lord et al. | |
| 2012/0287469 A1 | 11/2012 | Tomiyasu et al. | |
| 2012/0290387 A1 | 11/2012 | Davis | |
| 2013/0063561 A1 | 3/2013 | Stephan | |

OTHER PUBLICATIONS

Everingham et al., "Hello! My name is . . . Buffy—Automatic Naming of Characters in TV Video," Proceedings of the 17th British Machine Vision Conference (BMVC2006), pp. 889-908 (Sep. 2006).

FAQ from Pixazza's website as published on Feb. 22, 2010, retrieved at http://web.archive.org/web/20100222001945/http://www.pixazza.com/faq/.

Galleguillos et al., "Object Categorization using Co-Occurrence, Location and Appearance," IEEE Conference on Computer Vision and Pattern Recognition (CVPR) Anchorage, USA (2008).

Heitz & Koller, "Learning Spatial Context: Using Stuff to Find Things," European Conference on Computer Vision (ECCV) (2008).

Hoiem et al., "Putting Objects in Perspective," IJCV (80), No. 1 (Oct. 2008).

Jain et al., "Fast Image Search for Learned Metrics," Proceedings of the IEEE Conference on Computer Vision and Pattern Recognition (CVPR) (Jun. 2008).

Lober et al., "IML: An Image Markup Language," Proceedings, American Medical Informatics Association Fall Symposium, pp. 403-407 (2001).

Rao, Leena Google Ventures-Backed Pixazza Raises $12 Million for Crowdsourced 'AdSense for Images', published Jul. 18, 2010, retrieved from http://techcrunch.com/2010/07/18google-funded-pixazza-raises-12-million-for-crowdsourced-adsense-for-images/.

Russell & Torralba, "LabelMe: a database and web-based tool for image annotation," International Journal of Computer Vision, vol. 77, Issue 1-3, pp. 157-173 (May 2008).

Torralba, "Contextual Priming for Object Detection," International Journal of Computer Vision, vol. 53, Issue 2, pp. 169-191 (2003).

Venkatesan et al., "Robust Image Hashing" Image Processing Proceedings. 2000 International Conference vol. 3, 664-666 (2000).

* cited by examiner

IMAGE ANALYSIS SYSTEM AND METHOD USING IMAGE RECOGNITION AND TEXT SEARCH

SUMMARY

Provided herein are systems and method for obtaining contextual information of an image published on a digital medium. The methods and systems disclosed herein generally identify and analyze the image to obtain image descriptors corresponding to the image. The methods also identify and analyze text published proximate to the image to obtain textual descriptors, which function to describe, identify, index, or name the image or content within the image. The textual descriptors are then matched to the image descriptors to provide contextual information of the published image.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DEFINITIONS

Prior to describing the present invention in detail, it is useful to provide definitions for key terms and concepts used herein.

Contextual Advertising: a form of targeted advertising for advertisements and/or content appearing or displayed on digital media, such as websites or mobile browsers.

Contextual Information: data related to the contents and/or context of an image or content within the image; for example, but not limited to, a description, identification, index, or name of an image, or object, or scene, or person, or abstraction within the image.

Image: a visual representation of an object, or scene, or person, or abstraction.

In-image advertising: a form of contextual advertising where specific images on a digital medium are matched with related advertisements, and the related advertisements are then provided within or around the specific image.

Proximate: is intended to broadly mean "relatively adjacent, close, or near," as would be understood by one of skill in the art. The term "proximate" should not be narrowly construed to require an absolute position or abutment. For example, "text proximate to an image," means "text that is relatively near an image," but not necessarily abutting an image or image frame. In another example, "text proximate to an image," means "text on the same screen page or web page as an image."

Publisher: party that owns, provides, and/or controls a digital content platform or medium; or third-party charged with providing, maintaining, and/or controlling a digital content platform or medium. Digital content platforms include websites, browser-based web applications, software applications, mobile device applications, TV widgets, and equivalents thereof.

Unless defined otherwise, all technical and scientific terms used herein have the same meaning as commonly understood by one of ordinary skill in the art to which this invention belongs.

It is to be understood that the systems and methods provided below are not limited to particular embodiments described and, as such, may vary. It is also to be understood that the terminology used herein is for the purpose of describing particular embodiments only, and is not intended to be limiting, since the scope of the present invention will be limited only by the appended claims. It should also be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments are specifically embraced by the present invention and are disclosed herein just as if each and every combination was individually and explicitly disclosed, to the extent that such combinations embrace operable processes and/or devices/systems/kits.

Further, as will be apparent to those of skill in the art upon reading this disclosure, each of the individual embodiments described and illustrated herein has discrete steps, components, and/or features, which may be readily separated from or combined with the steps, components, and/or features of any of the other embodiments without departing from the scope or spirit of the present invention. Any recited method may be carried out in the order of events recited or in any other order that is logically possible.

DETAILED DESCRIPTION

The present invention generally relates to digital media applications. More specifically, the present invention relates to systems and methods for obtaining contextual information of an image published on a digital medium.

In digital media applications, a common goal is to identify the context of published images. To such aim, image recognition software and algorithms have been developed to analyze an image, and identify and differentiate objects/content within the image. Such algorithms may, for example, be able to differentiate between a human and a piece of luggage. However, such algorithms have limited specificity. Questions arise as to whether such image recognition algorithms can differentiate between, for example, a man and a woman, or more specifically determine the identity of the person, with 100% confidence. Similarly, questions arise as to whether such image recognition algorithms can identify product brands or names with 100% confidence.

Image recognition specificity is important for applications such as, for example, image-indexed searches, contextual advertising, digital content monitoring, etc. For example, for applications such as contextual advertising, the context of a published image is valuable to an advertiser. If an advertiser is able to identify the context of an image with a high degree of specificity and confidence, the advertiser can accurately match advertisements with published images. For example, if a digital publisher posts an image of a field hockey player, current image recognition algorithms may be able to analyze the image and determine that the image contains a person holding a stick. However, such information lacks the contextual specificity needed to determine whether the scene is of a baseball player, an ice hockey players, or in fact a field hockey player. The presented systems and methods, however, uses surrounding text to provide contextual information of a published image to identify the content and/or context of the image.

The methods provided herein generally identify an image published on a digital medium, and analyze the image with, for example, an image recognition engine to obtain image descriptors (or tags) corresponding to the image. The methods also, in series or parallel, identify text published proximate to the image on the digital medium, and analyze the text to obtain textual descriptors (or tags). The textual descriptors may vary, and in some instances function to describe, identify, index, or name the image or content within the image. The textual descriptors are then matched to the image descriptors to provide contextual information of the published image. The methods presented may be implemented on a computer-based system.

The following detailed description of the figures refers to the accompanying drawings that illustrate exemplary embodiments. Other embodiments are possible. Modifications may be made to the embodiments described herein without departing from the spirit and scope of the present invention. Therefore, the following detailed description is not meant to be limiting.

Figure 1:
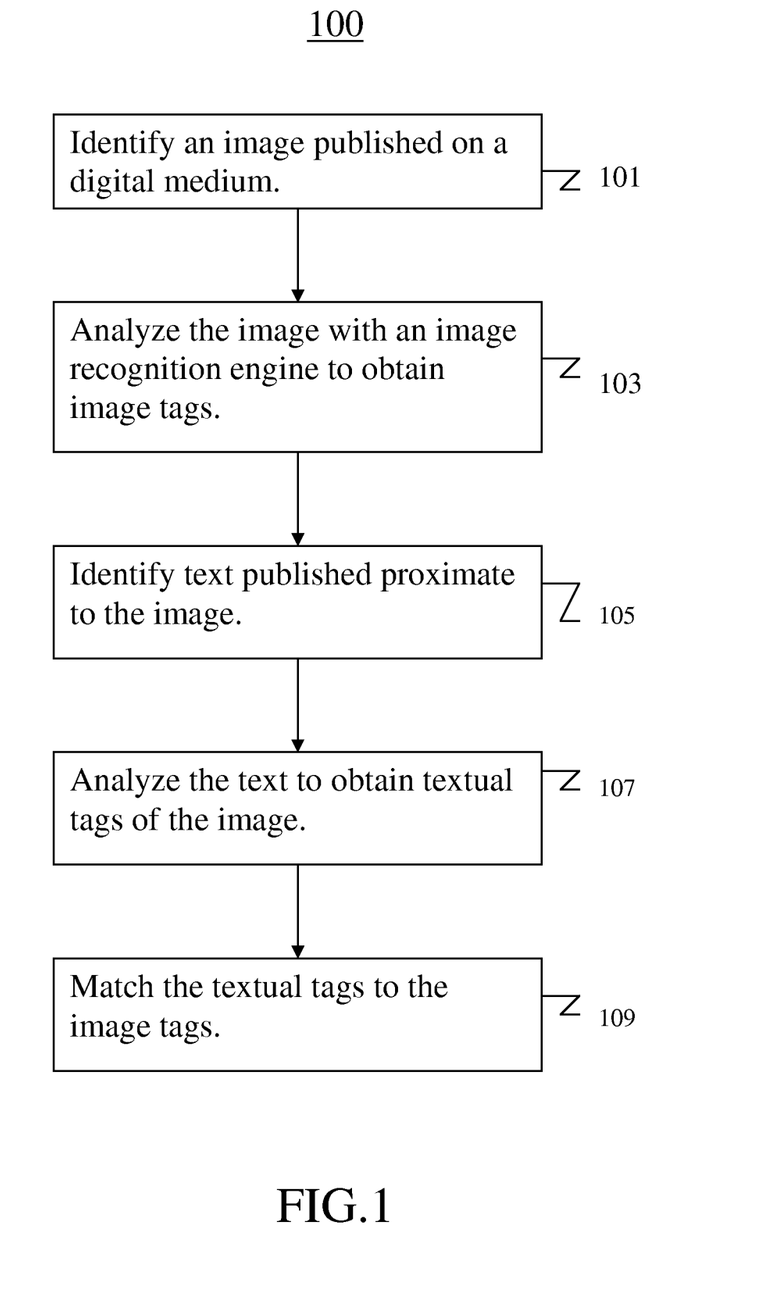
FIG. 1 is a flowchart illustrating one embodiment presented herein.
Figure 2:
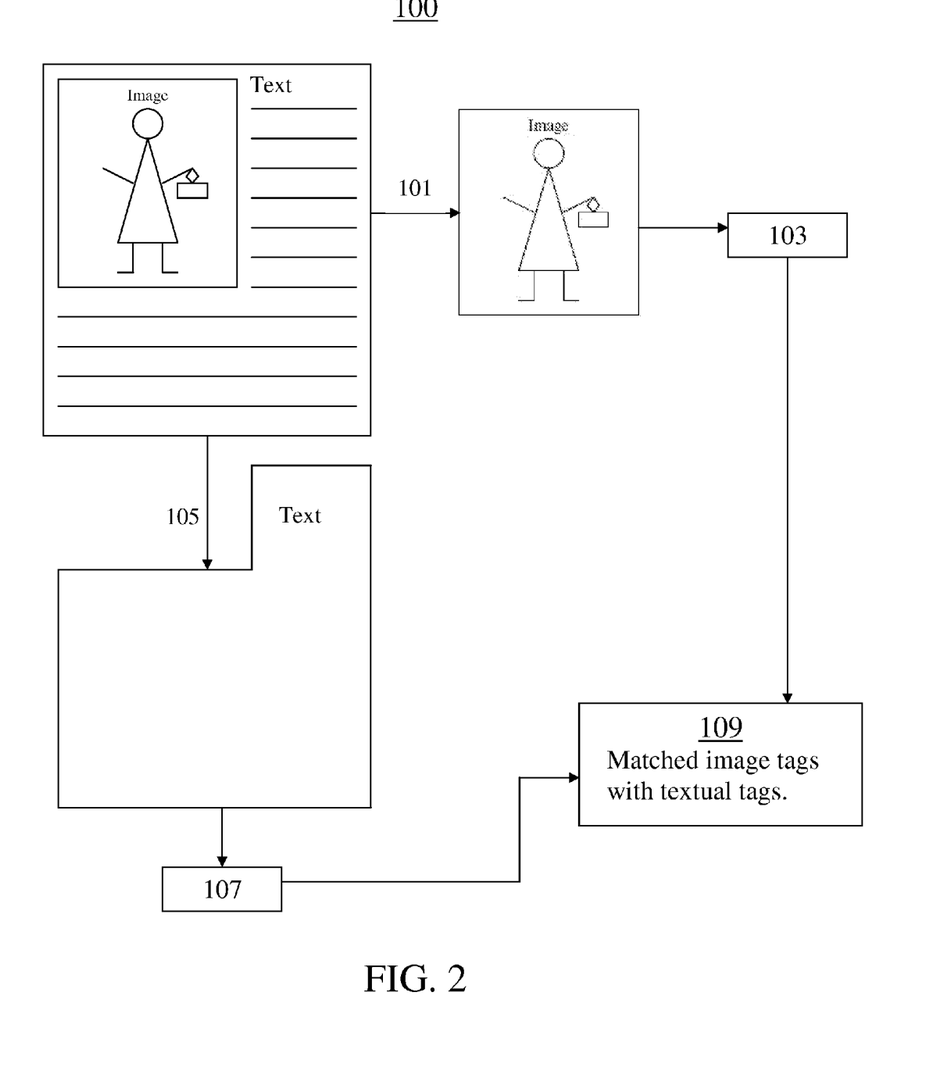
FIG. 2 is a high-level schematic diagram illustrating the method of FIG. 1.

FIG. 1 is a flowchart illustrating a method 100 of obtaining contextual information of a published digital image. FIG. 2 is a high-level schematic diagram illustrating the method of FIG. 1. In essence, method 100 dissects a digital publication to analyze and obtain information from the image and the text. The information derived from the image and the text is then correlated to ultimately obtain contextual information of the image with a high degree of specificity and confidence. In some instances, for example, the methods presented herein provide for image recognition with a higher degree of specificity and confidence than simply analyzing the image alone.

More specifically, in step 101, an image published on a digital medium is identified. Digital mediums can include, but are not limited to: web pages, software applications, mobile applications, TV widgets, and equivalents thereto. The identification of the digital image may be performed by, for example: having the publisher provide the image; having a browser or application-enabled program (e.g., a JavaScript widget) "scrape" the digital publication (e.g., a "walking the DOM" function); having a browser or application plug-in identify images on the digital medium; having a web-crawler gather information from one or more websites; or other equivalent protocols.

In step 103, the image is analyzed with an image recognition engine to obtain image descriptors or image tags. Any convenient image recognition algorithm (i.e., image recognition analysis program) may be employed. Image recognition algorithms include, but are not limited to, those described in, for example, Wang et al., "Content-based image indexing and searching using Daubechies' wavelts," Int J Digit Libr (1997) 1:311-328, which is herein incorporated by reference in its entirety (with the exception of term definitions that contradict with the terms explicitly defined above). As described below, image descriptors or image tags may include: common nouns; descriptive adjectives; positional information, such as, a real position coordinate, a boundary area coordinate, or coordinates that outline content within the image; or equivalent descriptors. Image descriptors or image tags may be standardized and/or application-specific.

In step 105, the text published proximate to the image is identified. The identification of the text may be performed by, for example: having the publisher provide the text; having a browser or application-enabled program (e.g., a JavaScript widget) "scrape" the digital publication (e.g., a "walking the DOM" function); having a browser or application plug-in identify the text on the digital medium; having a web-crawler gather information from one or more websites; or other equivalent protocols. In step 107, the identified text of step 105 is analyzed to obtain textual descriptors or textual tags of the image. Textual descriptors or textual tags may include: proper and/or common nouns; descriptive adjectives; positional information, such as, text position, position relative to image, or key word location; or equivalent descriptors. Textual descriptors or textual tags may be standardized and/or application-specific. In one embodiment, the text analysis employs a language-independent proximity pattern matching algorithm. Steps 105 and 107 may be performed before, after, in series, or in parallel to steps 101 and 103. In step 109, the textual descriptors (or tags) and image descriptors (or tags) are matched to provide contextual tags.

Figure 3:
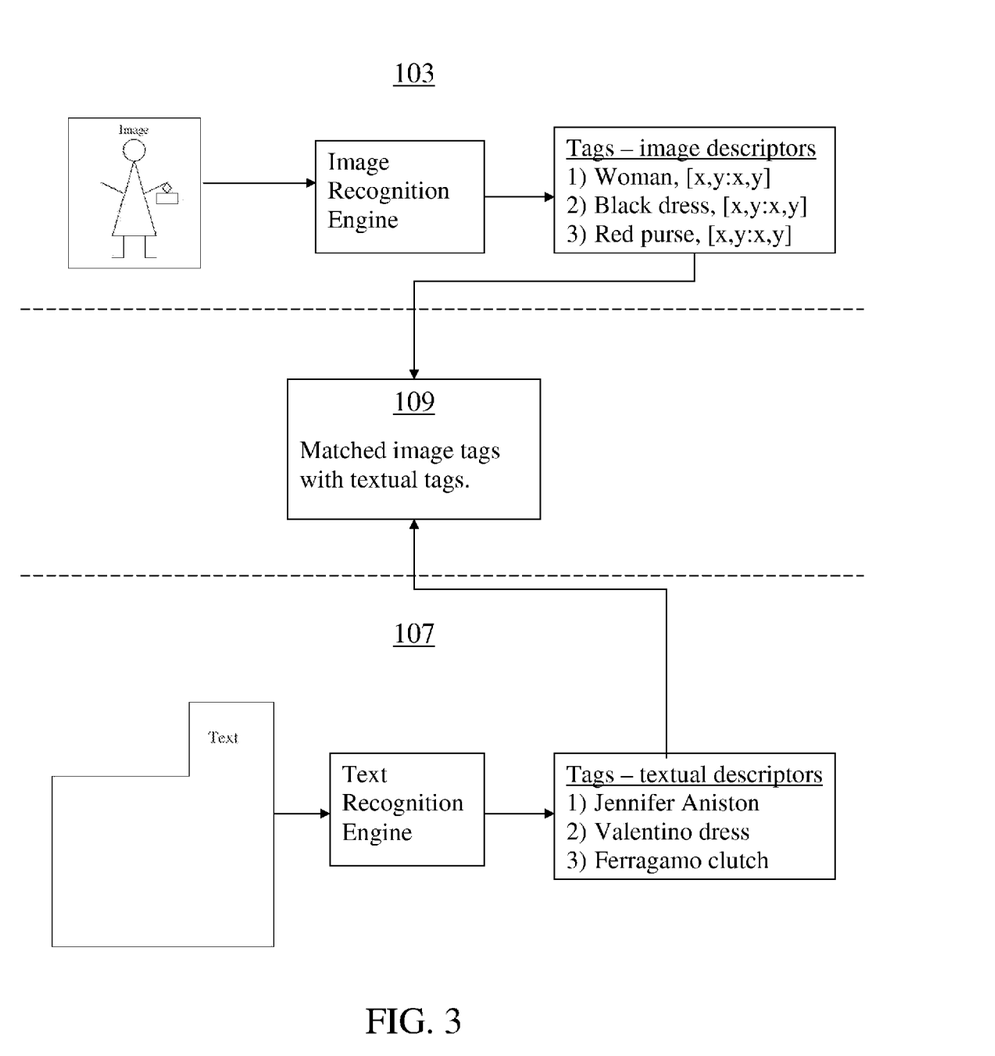
FIG. 3 is a flowchart illustrating an exemplary embodiment of the method illustrated in FIG. 1.

FIG. 3 is a flowchart illustrating an exemplary embodiment of the method 100 illustrated in FIG. 1. As shown, step 103 calls for processing the published image through an image recognition engine. The image recognition engine may then provide image tags and positional information. For example, for the image provided in FIG. 3, the image recognition engine may provide tags: (1) woman [x,y:x,y]; (2) black dress [x,y:x,y]; and (3) red purse [x,y:x,y]. The [x,y:x,y] coordinates identify where on the image the object (i.e., woman, black dress, or red purse) is located. In practice, if these tags are the only information that the image recognition engine can provide, such information is limited due to its lack of specificity. However, in step 107, the text proximate to the image is processed through a text recognition engine. The text is searched for textual tags; such as, for example, subject clues identifying, describing, and/or indexing the image. For example, the text proximate to the image may be a story about how Jennifer Aniston attended a movie premier wearing a black Valentino dress and a Ferragamo clutch. The text recognition engine identifies the textual tags "Jennifer Aniston," "Valentino dress," and "Ferragamo clutch." These textual tags are matched to the image tags, in step 109, to create contextual tags. The contextual tags provide additional specificity for identifying the content and/or context of the published image. In one application, for example, an advertiser can use the contextual tags to provide specific targeted advertisements (i.e., contextual advertising). A system of in-image advertising may also be employed based on the contextual tags. For example, if a web user were to mouse-over the black dress, an advertisement for a black Valentino dress may be provided as a "pop-up add."

In another embodiment, there is provided a method for determining a confidence level for an analyzed image. First, an image is submitted to an image recognition engine. Image tags (Set A) are the identified objects in the image. Next, associated text is submitted to an indexing engine. Text tags (Set B) are the subjects identified within the text. With reference to the above-provided example, Set A may include image tags: (1) woman; (2) black dress; and (3) red purse. Set B may include text tags: (1) Jennifer Aniston; (2) Valentino dress; and (3) Ferragamo clutch. Set A and Set B are processed through a matching engine, which may use object-type matching in order to identify which image tags match with corresponding text tags, resulting in Set M with matched tags. The "change in percentage" is defined as $\Delta\% = 100\%/(A_N+1)$, wherein $A_N$ is the total number of tags in Set A. Confidence level is defined as $C = M_N \times \Delta\%$, wherein $A_N$ is greater than 1, and wherein $M_N$ is the total number of object-type matches. Confidence level (C) can then be used as an indicator as to whether the content and/or context of the image has been positively identified. Confidence level (C) can also be used to make decisions, make the image interactive, and/or generally associate information related to the context of the image. Confidence level (C) can also be used to enable search indexing.

In another embodiment, there is provided a method of obtaining contextual information for an image published on a digital medium, the method comprising: obtaining an image tag and a textual tag from an image published on a digital medium and text published proximate to the image; and matching the textual tags with the image tags to obtain contextual information for the image. The method may further comprise identifying the image published on a digital medium. The image may be analyzed with an image recognition engine. The method may further comprise identifying the text published proximate to the image. The textual tag may function to describe, identify, index, or name the image or content within the image.

In yet another embodiment, there is provided a method of obtaining contextual information of an image published on a digital medium, comprising: (a) identifying an image published on a digital medium; (b) analyzing the image with an image recognition engine to obtain an image tag corresponding to the image; and (c) identifying text published proximate to the image on the digital medium. The method further includes: (d) analyzing the text from step (c) to obtain a textual tag, descriptor, or subject; and (e) matching the textual tag, descriptor or subject with the image tag. The textual tag, descriptor, or subject may function to describe, identify, index, or name the image or content within the image. The matched image tag and textual tag, descriptor, or subject serve as contextual descriptors of the image, and may be provided and/or displayed to a user. The textual tag, descriptor, or subject may be a proper noun, and the image tag may be a common noun. In such embodiment, the method may further comprise: (f) maintaining a database of proper nouns and corresponding common nouns; and (g) conducting a match query against the database to identify matching image tags and textual tags, descriptors, or subjects.

Further, the image recognition engine may create at least one tag for the image, wherein the tag includes the image descriptor and positional information corresponding to the image descriptor. The positional information may include coordinates selected from the group consisting of: a real position coordinate, a boundary area coordinate, a coordinate that outlines content within the image, and any combination thereof. Further, step (d) may employ a language-independent proximity pattern matching algorithm.

In another embodiment, there is provided a system for obtaining contextual information of an image published on a digital medium, comprising means for identifying an image published on a digital medium, which may include sub-systems and sub-protocols for performing step 101, and equivalents thereto. The system further comprises means for analyzing the image to obtain an image tag corresponding to the image, which may include sub-systems and sub-protocols for performing step 103, and equivalents thereto. The system further comprises means for identifying text published proximate to the image on the digital medium, which may include sub-systems and sub-protocols for performing step 105, and equivalents thereto. The system further includes means for analyzing the text to obtain a textual tag, descriptor, or subject that functions to describe, identify, index, or name the image or content within the image, which may include sub-systems and sub-protocols for performing step 107, and equivalents thereto. The system further includes means for linking the textual tag, descriptor, or subject with the image tag, which may include sub-systems and sub-protocols for performing step 109, and equivalents thereto. The system may further include: means for determining a confidence level of an analyzed image.

In still another embodiment, there is provide a system for obtaining contextual information of an image published on a digital medium, the system comprising: an identification module configured to identify an image published on a digital medium and text published proximate to the image; and a processor that receives and analyzes the image and text to obtain a contextual descriptor by matching at least one image tag with at least one textual tag corresponding to the image. The textual descriptor may function to describe, identify, index, or name the image or content within the image. The processor may be further configured to determine a confidence level for the matched image tag(s) and textual tag(s). The identification module may be a processing module for receiving an image from a publisher, a browser, an application-enabled program (e.g., a JavaScript widget), a browser or application plug-in, a web-crawler, or other equivalent system.

The methods and systems provided herein find use in a variety of application. One application of interest in contextual advertising. In one embodiment, for example, there is provided a method of contextual advertising, comprising: (a) identifying an image published on a digital medium; (b) analyzing the image with an image recognition engine to obtain an image tag corresponding to the image; and (c) identifying text published proximate to the image on the digital medium. The method further includes (d) analyzing the text from step (c) to obtain a textual tag, descriptor, or subject that functions to describe, identify, index, or name the image or content within the image; (e) matching the textual tag, descriptor, or subject with the image tag, wherein the matched textual tag, descriptor, or subject and the image tag serve as a contextual tag for the image; and (f) providing an advertising creative based on the contextual tag. The contextual tags may include positional information corresponding to the image. The positional information may include: a real position coordinate, a boundary area coordinate, or coordinates that outline content within the image. The method may also employ a language-independent proximity pattern matching algorithm. Such method may also be used for in-image advertising.

In still another embodiment, the presented methods may be incorporated into a digital media advertising protocol as described in U.S. patent application Ser. No. 12/902,066, filed on Oct. 11, 2010, titled "System and Method for Selecting Creatives Based on Visual Similarity and Campaign Metrics," which is herein incorporated by reference in its entirety (with the exception of term definitions that contradict with the terms explicitly defined above). For example, the present invention may be incorporated into a computer-implemented method of selecting an advertisement creative. The method includes the steps of: (a) receiving a request for a creative; (b) selecting a target creative from a database of creatives; and (c) providing the target creative in response to the request received in step (a). The request may be received from a publisher (e.g., a web publisher, or an application publisher), a web user, a web browser, a mobile application, or a merchant.

In practice, the target creative may be selected from the group consisting of a source creative and a plurality of replacement creatives. The plurality of replacement creatives includes creatives that are visually and contextually similar to the source creative. The replacement creatives may be visually and contextually similar to the source creative with a recognition confidence level of 0% or above, or of 50% or greater, or of 75% of greater, or of 85% or greater. The selection of the target creative may be based on factors selected from the group consisting of a source creative campaign metric, a recognition confidence level of one or more of the replacement creatives, a replacement creative campaign metric, a contextual similarity confidence level, a contextual tag, and any combination thereof. For example, the selection of the target creative may be based on which replacement creative is most visually and/or contextually similar to the source creative. The method may further include the step of cataloging the database of creatives based on visual and/or contextual similarity.

In yet another embodiment, there is provided a computer-readable storage medium, comprising instructions executable by at least one processing device that, when executed, cause the processing device to: (a) identify an image published on a digital medium; (b) analyze the image with an image recognition engine to obtain an image tag corresponding to the image; and (c) identify text published proximate to the image on the digital medium. The instructions further cause the processing device to (d) analyze the text to obtain a textual tag, descriptor, or subject that functions to describe, identify, index, or name the image or content within the image; and (e) match the textual tag, descriptor, or subject with the image tag.

The presented systems and methods, or any part(s) or function(s) thereof, may be implemented using hardware, software, or a combination thereof, and may be implemented in one or more computer systems or other processing systems. For example, the presented methods may be implemented with the use of one or more dedicated ad servers. Where the presented methods refer to manipulations that are commonly associated with mental operations, such as, for example, identifying, analyzing, obtaining, receiving or selecting, no such capability of a human operator is necessary. In other words, any and all of the operations described herein may be machine operations. Useful machines for performing the operation of the methods include general purpose digital computers or similar devices.

Figure 4:
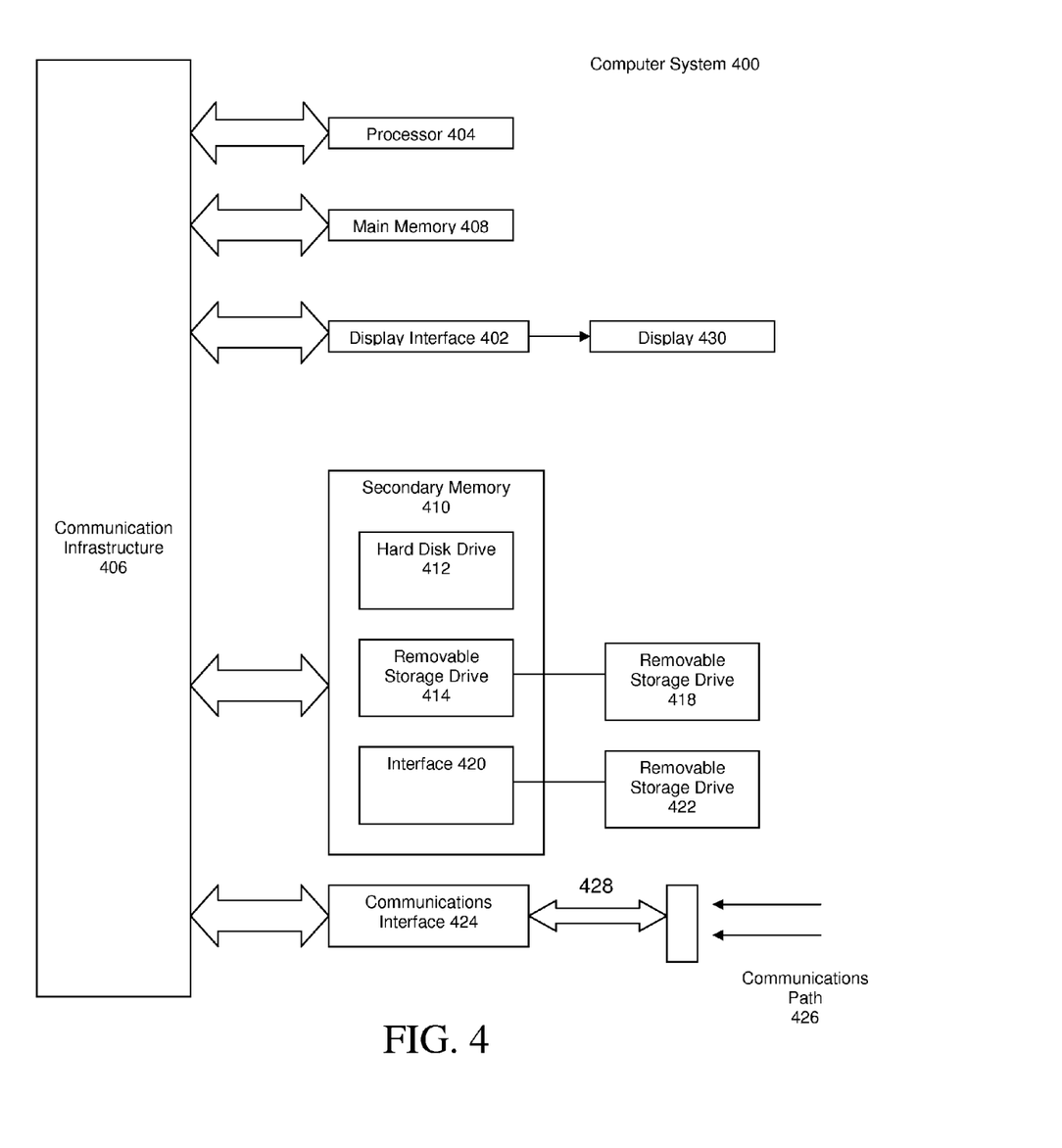
FIG. 4 is a schematic drawing of a computer system used to implement the methods presented herein.

In fact, in one embodiment, the invention is directed toward one or more computer systems capable of carrying out the functionality described herein. An example of a computer system 400 is shown in FIG. 4. Computer system 400 includes one or more processors, such as processor 404. The processor 404 is connected to a communication infrastructure 406 (e.g., a communications bus, cross-over bar, or network). Computer system 400 can include a display interface 402 that forwards graphics, text, and other data from the communication infrastructure 406 (or from a frame buffer not shown) for display on a local or remote display unit 430.

Computer system 400 also includes a main memory 408, such as random access memory (RAM), and may also include a secondary memory 410. The secondary memory 410 may include, for example, a hard disk drive 412 and/or a removable storage drive 414, representing a floppy disk drive, a magnetic tape drive, an optical disk drive, flash memory device, etc. The removable storage drive 414 reads from and/or writes to a removable storage unit 418 in a well known manner. Removable storage unit 418 represents a floppy disk, magnetic tape, optical disk, flash memory device, etc., which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 414, removable storage units 418, 422, data transmitted via communications interface 424, and/or a hard disk installed in hard disk drive 412. These computer program products provide software to computer system 400. Embodiments of the present invention are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the presented methods. Accordingly, such computer programs represent controllers of the computer system 400. Where appropriate, the processor 404, associated components, and equivalent systems and sub-systems thus serve as "means for" performing selected operations and functions.

In an embodiment where the invention is implemented using software, the software may be stored in a computer program product and loaded into computer system 400 using removable storage drive 414, interface 420, hard drive 412, or communications interface 424. The control logic (software), when executed by the processor 404, causes the processor 404 to perform the functions and methods described herein.

In another embodiment, the methods are implemented primarily in hardware using, for example, hardware components such as application specific integrated circuits (ASICs) Implementation of the hardware state machine so as to perform the functions and methods described herein will be apparent to persons skilled in the relevant art(s). In yet another embodiment, the methods are implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A method of obtaining contextual information for an image published on a digital medium, the method comprising:
   obtaining, by an image recognition engine, a set of image tags from an image published on a digital medium, wherein each of the image tags is an object identified in the image;
   obtaining, by a text recognition engine, a set of textual tags from text published proximate to the image, wherein each of the textual tags is a subject identified in the text; and
   matching, by a matching engine, the set of textual tags with the set of image tags based on object-type matching to obtain contextual information for objects identified in the image.

2. The method of claim 1, wherein the method further comprises identifying the image published on a digital medium.

3. The method of claim 1, wherein the image is analyzed with an image recognition engine.

4. The method of claim 1, wherein the method further comprises identifying the text published proximate to the image.

5. The method of claim 1, wherein the textual tag functions to describe, identify, index, or name the image or content within the image.

6. A method of obtaining contextual information for an image published on a digital medium, the method comprising:
   (a) identifying, by an image recognition engine, an image published on a digital medium;
   (b) analyzing the image with an image recognition engine to obtain a set of image tags corresponding to the image, wherein each of the image tags is an object identified in the image;
   (c) identifying, by a text recognition engine, text published proximate to the image on the digital medium;
   (d) analyzing the text from step (c) to obtain a set of textual tags, wherein each of the textual tags is a subject identified in the text; and
   (e) matching, by a matching engine, the set of textual tags with the set of image tags to obtain contextual information of the image, wherein the matched textual tags provide additional specificity for identifying objects in the image.

7. The method of claim 6, wherein the textual tag is a proper noun.

8. The method of claim 7, wherein the image tag is a common noun.

9. The method of claim 8, further comprising:
   (f) maintaining a database of proper nouns and corresponding common nouns.

10. The method of claim 9, further comprising:
    (g) conducting a match query against the database to identify matching image tags and textual tags.

11. The method of claim 6, wherein the image recognition engine creates at least one tag for the image, and wherein the tag includes the image tag and positional information corresponding to the image tag.

12. The method of claim 11, wherein the positional information includes coordinates selected from the group consisting of: a real position coordinate, a boundary area coordinate, a coordinate that outlines content within the image, and any combination thereof.

13. The method of claim 6, wherein step (d) further comprises employing a language-independent proximity pattern matching algorithm.

14. The method of claim 6, wherein the textual tag functions to describe, identify, index, or name the image or content within the image.

15. A system for obtaining contextual information of an image published on a digital medium, the system comprising:
    an identification module configured to identify an image published on a digital medium and text published proximate to the image; and
    a processor that receives and analyzes the image and text to obtain contextual tags by matching a set of image tags and a set of textual tags corresponding to the image, wherein each of the image tags is an object identified in the image, and wherein the each of textual tags is a subject identified in the text.

16. The system of claim 15, wherein the textual tag functions to describe, identify, index, or name the image or content within the image.

17. A method of contextual advertising, the method comprising:
    (a) identifying, by an image recognition engine, an image published on a digital medium;
    (b) analyzing the image with an image recognition engine to obtain a set of image tags corresponding to the image, wherein each of the image tags is an object identified in the image;

(c) identifying, by a text recognition engine, text published proximate to the image on the digital medium;

(d) analyzing the text from step (c) to obtain a set of textual tags, wherein each of the textual tags is a subject identified in the text;

(e) matching, by a matching engine, the set of textual tags with the set of image tags, wherein the linked textual tags and image tags serve as contextual tags for the image; and (f) providing an advertising creative based on the contextual tags.

18. The method of claim 17, wherein the tag includes positional information corresponding to the image tag.

19. The method of claim 18, wherein the positional information includes coordinates selected from the group consisting of: a real position coordinate, a boundary area coordinate, a coordinate that outlines content within the image, and any combination thereof.

20. The method of claim 17, wherein step (d) further comprises employing a language-independent proximity pattern matching algorithm.

21. The method of claim 17, wherein the textual tag functions to describe, identify, index, or name the image or content within the image.

22. A non-transitory computer-readable storage medium, comprising:

instructions executable by at least one processing device that, when executed, cause the processing device to (a) identify, by an image recognition engine, an image published on a digital medium;

(b) analyze the image with an image recognition engine to obtain a set of image tags corresponding to the image, wherein each of the image tags is an object identified in the image;

(c) identify, by a text recognition engine, text published proximate to the image on the digital medium;

(d) analyze the text to obtain a set of textual tags that function to describe, identify, index, or name the image or content within the image, wherein each of the textual tags is a subject identified in the text; and (e) match, by a matching engine, the set of textual tags with the set of image tags.

\* \* \* \* \*